United States Patent Office 3,038,900
Patented June 12, 1962

---

3,038,900
FLUORINE-SUBSTITUTED HYDRO-1,3,5-TRIAZINE
Howard M. Dess, Erdenheim, Pa., assignor to Pennsalt Chemicals Corporation, Philadelphia, Pa., a corporation of Pennsylvania
No Drawing. Filed Apr. 23, 1958, Ser. No. 730,263
10 Claims. (Cl. 260—248)

This invention relates to novel fluorinated 1,3,5-triazines. Particularly it relates to fluorinated 1,3,5-triazines wherein one to three pairs of fluorine atoms have been introduced into the nitrogen-to-carbon double bonds of the 1,3,5-triazine molecule. More particularly it relates to fluorinated 1,3,5-triazines of the formula

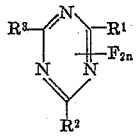

wherein $R^1$, $R^2$, and $R^3$ include hydrogen, chlorine, fluorine, bromine, hydroxyl, trichloromethyl, trifluoromethyl, lower alkyl groups having 1–4 carbon atoms, phenyl, chlorophenyl and tolyl, $n$ is an integer from 1 to 3 inclusive, and each pair of fluorine atoms present saturates one of the double bonds shown.

The compounds of this invention are liquids which are useful, particularly under extreme temperature conditions, as heat transfer agents, gyroscopic fluids, lubricants, hydraulic fluids, plasticizers, and as oxidizers for rocket fuels. They are also useful as chemical intermediates for the preparation of other fluorinated 1,3,5-triazine compounds wherein one or more of the $R^1$, $R^2$, and $R^3$ groups is coupled to other molecular structures to form compounds valuable as pesticides and dyes.

In the prior art it is known to attach halogen substituents to the carbon atoms of the 1,3,5-triazine molecule and to halogenate amido and alkyl groups attached to the carbon atom. However, direct halogenation of the carbon-to-nitrogen double bonds of the 1,3,5-triazine molecule has not heretofore been known. I have now unexpectedly found that fluorine can be introduced into said double bonds by the method herein disclosed. The compounds formed are novel and have many valuable properties as stated above.

My novel fluorinated 1,3,5-triazine compounds are prepared by the direct fluorination of a 1,3,5-triazine of the formula

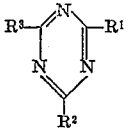

wherein $R^1$, $R^2$, and $R^3$ are the same as above, with elemental fluorine, preferably in gaseous form, at a temperature in the range from about −40° C. to about 100° C. A liquid product is formed and is recovered by distillation from the reaction mass.

Said 1,3,5-triazine, or symmetrical triazines, starting materials are compounds which are known in the art or which are readily derived from known compounds by known methods.

Depending on the temperature at which the reaction is carried out, one, two, or three pairs of fluorine atoms are introduced into the nitrogen-to-carbon double bonds of the triazine ring. For example, in the fluorination of cyanuric chloride at −40° C. to about −10° C., 2,3-difluoro-2,4,6-trichlorodihydro-1,3,5-triazine (I) is formed as shown in Equation 1; fluorination at −10° C. to about 0° C. forms 2,3,4,5-tetrafluoro-2,4,6-trichloro-tetrahydro-1,3,5-triazine (II), as shown in Equation 2; and fluorination at 10° C. to about 60° C. forms 1,2,3,4,5,6-hexafluoro-2,4,6-trichloro-hexahydro - 1,3,5 - triazine (III) as shown in Equation 3.

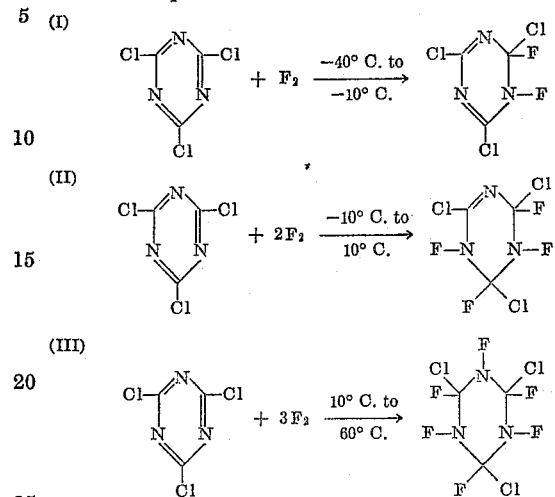

Dilution of the fluorine with an inert gas, e.g., nitrogen, is helpful in controlling the rate of the reaction. Below −40° C. practically no reaction has been found to occur. On the other hand, at excessively high temperatures degradation of the triazine ring occurs, with consequent production of nitrogen trifluoride, carbon tetrafluoride and other cleavage products. The upper temperature limit varies, depending on the substituents present on the 1,3,5-triazine. For example, in the case of 2,4,6-trichloro-1,3,5-triazine, decomposition may be observed to begin above 60° C. With some compounds it will be higher, with others it will be lower. With trifluoromethyl-substituted 1,3,5-triazine, temperatures as high as 100° C. may be used without significant degradation occurring.

The fluorine atoms in my fluorinated 1,3,5-triazine structure are stable and chemically non-active in the sense that they are not available for oxidative purposes as are, for example, the bromine atoms in the perbromides of 1,3,5-triazine and related compounds disclosed and claimed by Grundmann et al., in U.S. Patent No. 2,777,847, issued January 15, 1957, and in the chlorinated amines, i.e., chlorinated melamine, of Muskat in U.S. Patent No. 2,184,883, issued December 26, 1939.

The $R^1$, $R^2$, and $R^3$ groups of the starting 1,3,5-triazine used in practicing the invention may all be identical or may be mixed members of the group shown above. Preferably they are identical. Trifluoromethyl is the most preferred $R^1$, $R^2$, $R^3$ member, but trichloromethyl, chlorine, fluorine, and bromine are also highly preferred.

The fluorination reaction according to this invention introduces the fluorine atoms specifically into the double bonds of the 1,3,5-triazine molecule. The substituents on the carbon atoms of the molecule are not ordinarily attacked by the fluorine; however, it is possible that some substituent groups, e.g., alkyl, also may be simultaneously fluorinated under certain conditions of temperature and pressure. The halogen atoms on the carbon atoms of the halogenated 1,3,5-triazines used as starting materials are there introduced by hydrohalogenation with, as the case may require, HF, HCl, or HBr.

The reactions of this invention may be carried out either in the presence of an inert solvent or in the absence of a solvent, preferably under the latter condition. When a solvent is used, the solvent should be a material which itself is unattacked by elemental fluorine under the conditions of the process. Fluorocarbon oils may be used for this purpose. Also, a previously fluorinated 1,3,5-triazine may be used, preferably of the same species as that which is to be prepared. The amount of solvent to be used is easily determined by simple tests. The amount used should permit ease of removal of the heat of reaction and facilitate contact of the fluorine with the 1,3,5-triazine reactant.

The rate of addition of the fluorine to the reaction mass should be sufficiently rapid to permit the reaction to proceed rapidly and smoothly, but not so rapidly as to permit an appreciable amount of the gas to pass unreacted out of the reaction vessel. The presence of a large excess of fluorine may cause adverse side reactions with the substituent groups of the 1,3,5-triazine.

The reactions involved in carrying out my invention are exothermic and it is necessary that the evolved heat be removed from the reactor system. It is desirable to keep the reaction mass at temperatures which are sufficiently high to cause reaction to proceed at a reasonable rate, but not so high that the range for a particular degree of fluorination is exceeded; otherwise, mixtures of di-, tetra-, and/or hexafluorinated 1,3,5-triazines will be formed. Furthermore, at excessively high temperatures decomposition may occur.

Pressure is not critical and the reaction may be conducted at atmospheric or super-atmospheric pressures. A slight pressure of about 0.1 to 5 p.s.i.g. is convenient and is preferably used.

The reaction may be conducted in a vessel in batch-wise fashion. In such a case, agitation of the reaction mixture is beneficial in increasing the rate of reaction and facilitating heat-transfer. The process may also be conducted in a continuous manner by introducing the reactants continuously into a tower or pipe system wherein they are circulated and from which crude product is continuously withdrawn.

The following examples of the preparation of my novel compounds are presented for the purpose of illustrating the invention, it being understood that the invention is not intended to be restricted to these examples.

*Example 1*

Three grams of cyanuric chloride are spread out in a thin layer in a nickel flask reactor. The flask is cooled to 0° C. A stream of nitrogen is passed through the reactor at a rate of about 1 liter per hour. Fluorine gas is then mixed with the nitrogen in a ratio of 1:1 and the mixed gases passed through the reactor in contact with the cyanuric chloride at a rate corresponding to 1 liter of fluorine per hour. The temperature is maintained at about 0°±5° C. throughout the reaction period by controlling the flow rate. After about one and one-quarter hours, with more than a stoichiometric amount of fluorine having been introduced into the reactor, the nitrogen is shut off and pure fluorine is introduced for another half-hour to ensure complete reaction of the cyanuric chloride. The reaction mass at this stage is a substantially clear colorless liquid.

Vacuum distillation of the reaction mass from a typical reaction gives a product distilling at 75° C. at 34 mm.

Chemical analysis for 2,3,4,5-tetrafluoro-2,4,6-trichloro-tetrahydro-1,3,5-triazine having the empirical formula $C_3N_3F_4Cl_3$ gave the following:

Calc.: C, 13.8%; N, 16.1%; Cl, 40.9%; and F, 29.2%.
Found: C, 13.8%; N, 16.5%; Cl, 39.3%; and F, 28.5%.

The structure of the compound was confirmed by infrared spectroscopy to be a novel compound containing nitrogen-to-fluorine bonds.

Said compound is a liquid which becomes viscous on cooling to about −80° C. and sets at about −90° C. The compound boils at about 160° C. at atmospheric pressure. Its density is 1.8 gms./cm.$^3$. It is not hydrolyzed on standing in water for 1 week at 25° C. The chlorine atoms on the compound are attacked by 5% NaOH solution at about 25° C. The fluorine atoms on the ring, however, are not attacked by the NaOH. It is thermally stable up to about 200° C. The liquid is unreactive with stainless steel at 160° C.

*Example 2*

Following the procedure given in Example 1, except that the temperature is maintained at about 10° C. to about 40° C., cyanuric chloride is treated with sufficient fluorine gas to prepare 1,2,3,4,5,6-hexafluoro-2,4,6-trichloro-hexahydro-1,3,5-triazine, which boils about 100° C.–105° C. at 34 mm.

*Example 3*

Following the procedure given in Example 1, except that the temperature is maintained at about −20° C. to about −10° C., cyanuric chloride is treated with sufficient fluorine gas to prepare 2,3-difluoro-2,4,6-trichloro-dihydro-1,3,5-triazine, which boils at about 50° C.–55° C. at 34 mm.

Further following the procedure given in Examples 1–3, a large variety of difluorinated, tetrafluorinated, and hexafluorinated 1,3,5-triazines with substituents other than chlorine on the ring may readily be prepared, as shown in the following examples.

*Example 4*

2,3-difluoro-dihydro-1,3,5-triazine is prepared by reacting 1,3,5-triazine with sufficient fluorine gas, as shown in Example 1, at about −20° C. to about −10° C.

*Example 5*

2,3,4,5-tetrafluoro-tetrahydro-1,3,5-triazine is prepared by reacting 1,3,5-triazine with sufficient fluorine gas, as shown in Example 1, at about −10° C. to about 10° C.

*Example 6*

1,2,3,4,5,6-hexafluoro-hexahydro-1,3,5-triazine is prepared by reacting 1,3,5-triazine with sufficient fluorine gas, as shown in Example 1, at about 10° C. to about 40° C.

*Example 7*

2,2,3,4,6-pentafluoro-dihydro-1,3,5-triazine is prepared by reacting 2,4,6-trifluoro-1,3,5-triazine with sufficient fluorine gas, as shown in Example 1, at about −20° C. to about −10° C. The product boils in the range 110°–115° C.

*Example 8*

2,2,3,4,4,5,6-heptafluoro-tetrahydro - 1,3,5 - triazine is prepared by reacting 2,4,6-trifluoro-1,3,5-triazine with sufficient fluorine gas, as shown in Example 1, at about −10° C. to about 10° C.

*Example 9*

1,2,2,3,4,4,5,6,6-nonafluoro-hexahydro-1,3,5-triazine is prepared by reacting 2,4,6-trifluoro-1,35-triazine with sufficient fluorine gas, as shown in Example 1, at about 10° C. to about 40° C.

*Example 10*

2,3-difluoro-2,4,6-tribromo-dihydro-1,3,5-triazine is prepared by reacting 2,4,6-tribromo-1,3,5-triazine with sufficient fluorine gas, as shown in Example 1, at about −20° C. to about −10° C.

*Example 11*

2,3,4,5-tetrafluoro-2,4,6-tribromo - tetrahydro-1,3,5-triazine is prepared by reacting 2,4,6-tribromo-triazine with sufficient fluorine gas, as shown in Example 1, at about −10° C. to about 10° C. The product boils in the range 90° C.–95° C. at 25 mm.

*Example 12*

1,2,3,4,5,6-hexafluoro-2,4,6-tribromo - hexahydro-1,3,5-triazine is prepared by reacting 2,4,6-tribromo-1,3,5-triazine with sufficient fluorine gas, as shown in Example 1, at about 10° C. to about 40° C.

*Example 13*

2,3-difluoro-2,4,6-trihydroxydihydro - 1,3,5 - triazine is prepared by reacting 2,4,6-trihydroxy-1,3,5-triazine with sufficient fluorine gas, as shown in Example 1, at about —20° C. to about —10° C.

*Example 14*

2,3,4,5-tetrafluoro-2,4,6-trihydroxy - tetrahydro - 1,3,5-triazine is prepared by reacting 2,4,6-trihydroxy-1,3,5-triazine with sufficient fluorine gas, as shown in Example 1, at about —10° C. to about 10° C.

*Example 15*

1,2,3,4,5,6-hexafluoro-2,4,6-trihydroxy - hexahydro-1,3,5-triazine is prepared by reacting 2,4,6-trihydroxy-1,3,5-triazine with sufficient fluorine gas, as shown in Example 1, at about 10° C. to about 40° C.

*Example 16*

2,3-difluoro-2,4,6 - tris(trichloromethyl)-dihydro-1,3,5 triazine is prepared by reacting 2,4,6-tris(trichloromethyl)-1,3,5-triazine with sufficient fluorine gas, as shown in Example 1, at about —20° C. to about —10° C. The product boils in the range 100° C.–105° C.

*Example 17*

2,3,4,5 - tetrafluoro - 2,4,6 - tris(trichloromethyl)-tetrahydro-1,3,5-triazine is prepared by reacting 2,4,6-tris(trichloromethyl)-1,3,5-triazine with sufficient fluorine gas, as shown in Example 1, at about —10° C. to about 10° C.

*Example 18*

1,2,3,4,5,6 - hexafluoro - 2,4,6 - tris(trichloromethyl)-hexahydro-1,3,5-triazine is prepared by reacting 2,4,6-tris(trichloromethyl)-1,3,5-triazine with sufficient fluorine gas, as shown in Example 1, at about 10° C. to about 40° C.

*Example 19*

2,3 - difluoro - 2,4,6 - tris(trifluoromethyl) - dihydro-1,3,5-triazine is prepared by reacting 2,4,6-tris(trifluoromethyl-1,3,5-triazine with sufficient fluorine gas, as shown in Example 1, at about —20° C. to about 10° C.

*Example 20*

2,3,4,5 - tetrafluoro - 2,4,6 - tris(trifluoromethyl) - tetrahydro-1,3,5-triazine is prepared by reacting 2,4,6 - tris(trifluoromethyl)-1,3,5-triazine with sufficient fluorine gas, as shown in Example 1, at about 10° C. to about 40° C. The product boils in the range 195° C.–200° C.

*Example 21*

1,2,3,4,5,6 - hexafluoro - 2,4,6 - tris(trifluoromethyl)-hexahydro-1,3,5-triazine is prepared by reacting 2,4,6-tris-(trifluoromethyl)-1,3,5-triazine with sufficient fluorine gas, as shown in Example 1, at about 40° C. to about 100° C. The product boils in the range 130° C.–135° C. at 5 mm.

*Example 22*

2,3 - difluoro - 2,4,6 - trimethyl - dihydro - 1,3,5 - triazine is prepared by reacting 2,4,6-trimethyl-1,3,5-triazine with sufficient fluorine gas, as shown in Example 1, at about —20° C. to about —10° C.

*Example 23*

2,3,4,5- tetrafluoro-2,4,6 - trimethyl - tetrahydro-1,3,5-triazine is prepared by reacting 2,4,6-trimethyl-1,3,5-triazine with sufficient fluorine gas, as shown in Example 1, at about —10° C. to about 10° C.

*Example 24*

1,2,3,4,5,6 - hexafluoro - 2,4,6 - trimethyl - hexahydro-1,3,5-triazine is prepared by reacting 2,4,6-trimethyl-1,3,5-triazine with sufficient fluorine gas, as shown in Example 1, at about 10° C. to about 40° C.

*Example 25*

2,3-difluoro-2,4,6-triethyl-dihydro-1,3,5-triazine is prepared by reacting 2,4,6-triethyl-1,3,5-triazine with sufficient fluorine gas, as shown in Example 1, at about —20° C. to about —10° C.

*Example 26*

2,3,4,5 - tetrafluoro - 2,4,6 - triethyl-tetrahydro - 1,3,5-triazine is prepared by reacting 2,4,6-triethyl-1,3,5-triazine with sufficient fluorine gas, as shown in Example 1, at about —10° C. to about 10° C. The product boils in the range 175° C.–180°·C. at 5 mm.

*Example 27*

1,2,3,4,5,6 - hexafluoro - 2,4,6 - triethyl - hexahydro-1,3,5-triazine is prepared by reacting 2,4,6-triethyl-1,3,5-triazine with sufficient fluorine gas, as shown in Example 1, at about 10° C. to about 40° C.

*Example 28*

2,3-difluoro-2,4,6-tripropyl-dihydro-1,3,5-triazine is prepared by reacting 2,4,6-triethyl-1,3,5-triazine with sufficient fluorine gas, as shown in Example 1, at about —20° C. to about —10° C.

*Example 29*

2,3,4,5 - tetrafluoro - 2,4,6 - tripropyl - tetrahydro-1,3,5-triazine is prepared by reacting 2,4,6-tripropyl-1,3,5-triazine with sufficient fluorine gas, as shown in Example 1, at about —10° C. to about 10° C.

*Example 30*

1,2,3,4,5,6 - hexafluoro - 2,4,6 - tripropyl - hexahydro-1,3,5-triazine is prepared by reacting 2,4,6-tripropyl-1,3,5-triazine with sufficient fluorine gas, as shown in Example 1, at about 10° C. to about 40° C.

*Example 31*

2,3-difluoro-2,4,6-tributyl-dihydro-1,3,5-triazine is prepared by reacting 2,4,6-tributyl-1,3,5-triazine with sufficient fluorine gas, as shown in Example 1, at about —20° C. to about —10° C.

*Example 32*

2,3,4,5 - tetrafluoro - 2,4,6 - tributyl - tetrahydro - 1,3,5-triazine is prepared by reacting 2,4,6-tributyl-1,3,5-triazine with sufficient fluorine gas, as shown in Example 1, at about —10° C. to about 10° C.

*Example 33*

1,2,3,4,5,6 - hexafluoro - 2,4,6 - tributyl - hexahydro-1,3,5-triazine is prepared by reacting 2,4,6-tributyl-1,3,5-triazine with sufficient fluorine gas, as shown in Example 1, at about 10° C. to about 40° C.

*Example 34*

2,3-difluoro-2,4,6-triphenyl-dihydro-1,3,5-triazine is prepared by reacting 2,4,6-triphenyl-1,3,5-triazine with sufficient fluorine gas, as shown in Example 1, at about —20° C. to about —10° C. The product boils in the range 137–138° C. at 25 mm. pressure.

*Example 35*

2,3,4,5 - tetrafluoro - 2,4,6 - triphenyl - tetrahydro-1,3,5-triazine is prepared by reacting 2,4,6-triphenyl-1,3,5-triazine with sufficient fluorine gas, as shown in Example 1, at about —10° C. to about 10° C. The product boils in the range 159–160° C. at 25 mm. pressure.

*Example 36*

1,2,3,4,5,6 - hexafluoro - 2,4,6 - triphenyl - hexahydro-1,3,5-triazine is prepared by reacting 2,4,6-triphenyl-1,3,5-triazine with sufficient fluorine gas, as shown in Example 1, at about 10° C. to about 60° C. The product boils in the range 195–196° C. at 25 mm.

*Example 37*

2,3 - difluoro-2,4,6 - tris(chlorophenyl) - dihydro-1,3,5-triazine is prepared by reacting 2,4,6-tris(chlorophenyl)-1,3,5-triazine with sufficient fluorine gas, as shown in Example 1, at about —20° C. to about —10° C.

*Example 38*

2,3,4,5 - tetrafluoro - 2,4,6 - tris(chlorophenyl) - tetrahydro-1,3,5-triazine is prepared by reacting 2,4,6-tris(chlorophenyl)-1,3,5-triazine with sufficient fluorine gas, as shown in Example 1, at about —10° C. to about 10° C.

*Example 39*

1,2,3,4,5,6 - hexafluoro - 2,4,6 - tris(chlorophenyl)-hexahydro-1,3,5-triazine is prepared by reacting 2,4,6-tris(chlorophenyl)-1,3,5-triazine with sufficient fluorine gas, as shown in Example 1, at about 10° C. to about 60° C.

*Example 40*

2,3-difluoro-2,4,6-tritolyl-dihydro-1,3,5-triazine is prepared by reacting 2,4,6-tritolyl-1,3,5-triazine with sufficient fluorine gas, as shown in Example 1, at about —20° C. to about —10° C.

*Example 41*

2,3,4,5 - tetrafluoro-2,4,6 - tritolyl - tetrahydro - 1,3,5-triazine is prepared by reacting 2,4,6-tritolyl-1,3,5-triazine with sufficient fluorine gas, as shown in Example 1, at about —10° C. to about 10° C.

*Example 42*

1,2,3,4,5,6-hexafluoro-2,4,6-tritolyl-hexahydro-1,3,5 - triazine is prepared by reacting 2,4,6-tritolyl-1,3,5-triazine with sufficient fluorine gas, as shown in Example 1, at about 10° C. to about 40° C.

*Example 43*

2,3-difluoro-2-chloro-dihydro-1,3,5-triazine is prepared by reacting 2-chloro-1,3,5-triazine with sufficient fluorine gas, as shown in Example 1, at about —20° C. to about —10° C. The product boils in the range 47–48° C. at 25 mm. pressure.

*Example 44*

2,3,4,5-tetrafluoro-2-chloro-tetrahydro-1,3,5-triazine is prepared by reacting 2-chloro-1,3,5-triazine with sufficient fluorine gas, as shown in Example 1, at about —10° C. to about 10° C. The product boils in the range 70–71° C. at 25 mm. pressure.

*Example 45*

1,2,3,4,5,6-hexafluoro-2-chloro-hexahydro-1,3,5-triazine is prepared by reacting 2-chloro-1,3,5-triazine with sufficient fluorine gas, as shown in Example 1, at about 10° C. to about 40° C. The product boils in the range 101–102° C. at 25 mm. pressure.

*Example 46*

2,3-difluoro-2,4-dichloro-dihydro-1,3,5-triazine is prepared by reacting 2,4-dichloro-1,3,5-triazine with sufficient fluorine gas, as shown in Example 1, at about —20° C. to about —10° C. The product boils in the range 65–66° C. at 25 mm. pressure.

*Example 47*

2,3,4,5-tetrafluoro-2,4-dichloro-tetrahydro-1,3,5-triazine is prepared by reacting 2,4-dichloro-1,3,5-triazine with sufficient fluorine gas, as shown in Example 1, at about —10° C. to about 10° C. The product boils in the range 89–90° C. at 25 mm. pressure.

*Example 48*

1,2,3,4,5,6-hexafluoro-2,4-dichloro-hexahydro-1,3,5 - triazine is prepared by reacting 2,4-dichloro-1,3,5-triazine with sufficient fluorine gas, as shown in Example 1, at about 10° C. to about 40° C. The product boils in the range 117–118° C. at 25 mm. pressure.

The fluorinated 1,3,5-triazines of this invention are particularly useful as oxidizers in a hypergolic bipropellant liquid system for jet propulsion. The compounds have properties which make them well-suited for this use. For example, they are liquid at ordinary temperautres and pressures; they are highly stable to shock and heat; they are reasonably non-corrosive; and they have high densities. On the latter point, 2,3,4,5-tetrafluoro-2,4,6-trichloro-tetrahydro-1,3,5-triazine, for example, has a liquid density of 1.8 compared to 1.14 for liquid oxygen and 1.49 for liquid $N_2O_4$.

The hypergolic nature of fluorinated 1,3,5-triazine is demonstrated by the following example.

*Example 49*

A drop of 2,3,4,5-tetrafluoro-2,4,6-trichloro-tetrahydro-1,3,5-triazine was placed on a nickel surface and contacted with a small amount of sodium amide on a spatula. The mixture immediately burst into flame.

In using a fluorinated 1,3,5-triazine oxidizer in a hypergolic bipropellant liquid system, said oxidizer is burned with a fuel comprising essentially a combustible substance of an element from groups I to III inclusive having an atomic number less than 21. The fuel substance may consist of the element itself in its elemental form or it may consist of the element in chemical combination with certain combustible radicals. Such fuels are well-known in the art of rocketry. The fuels which can be used advantageously with my novel oxidizer include the elements lithium, hydrogen, beryllium, boron, aluminum, magnesium, calcium, potassium and sodium, and the hydrides, amides, nitrides, and organometallic derivatives of said elements other than hydrogen. These fuel components may be burned, individually or in mixtures with each other, with a fluorinated 1,3,5-triazine to generate thrust in a reaction chamber.

The fuels, other than hydrogen, are preferably used in a fluidized form, i.e., as a solution in a combustible solvent or as a finely comminuted powder suspended in a combustible liquid vehicle. Lithium-aluminum hydride dissolved in ether is preferably used in practicing this phase of my invention.

The use of fluorinated 1,3,5-triazine as an oxidizer in a rocket application is demonstrated in the following example.

*Example 50*

2,3,4,5-tetrafluoro-2,4,6-trichloro-tetrahydro-1,3,5 - triazine is placed in the oxidizer supply tank of a rocket engine. A 25% solution of lithium-aluminum hydride in ether is placed in the fuel supply tank. The storage tanks are pressurized with an inert gas. A stream of reactant from each supply tank is fed in a combustible ration into a reaction chamber where the two streams of reactants, the oxidizer and the fuel, are mixed. Ignition is spontaneous. The gaseous products of the combustion are ejected from the reaction chamber, providing the thrust to propel the rocket.

In a manner similar to that described in Example 50, 2,3,4,5-tetrafluoro-2,4,6-trichloro-tetrahydro-1,3,5-triazine can be burned with hydrogen or a liquified form or suspension of lithium, beryllium, boron, aluminum, magnesium, calcium, potassium and sodium, or of their respective hydrides, nitrides, amides and mixtures, or organometallic derivatives to provide gaseous combustion products to produce thrust from a reaction chamber. Furthermore, other members of my novel fluorinated 1,3,5-triazines likewise can be burned with the above fuels to produce thrust from a reaction chamber.

Many different embodiments of this invention may be made without departing from the spirit and scope of it,

I claim:
1. A fluorinated 1,3,5-triazine selected from the group consisting of compounds of the formulae

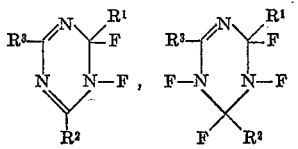

and

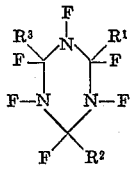

in which $R^1$, $R^2$ and $R^3$ are members selected from the class consisting of hydrogen, chlorine, bromine, hydroxyl, trichloromethyl, trifluoromethyl, lower alkyl groups having 1 to 4 carbon atoms inclusive, phenyl, chlorophenyl and tolyl.

2. 1,2,3,4,5,6-hexafluoro-2,4,6-trichloro-hexahydro-1,3,5-triazine.

3. 1,2,3,4,5,6-hexafluoro-2,4,6-tris(trifluoromethyl)-hexahydro-1,3,5-triazine.

4. The process for preparing a fluorinated 1,3,5-triazine selected from the group consisting of compounds of the formulae

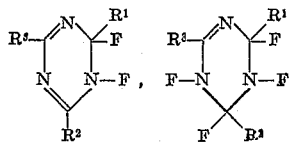

and

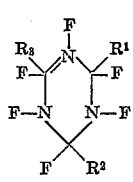

in which $R^1$, $R^2$ and $R^3$ are members selected from the class consisting of hydrogen, chlorine, bromine, hydroxyl, trichloromethyl, trifluoromethyl, lower alkyl groups having 1 to 4 carbon atoms inclusive, phenyl, chlorophenyl and tolyl which comprises contacting a 1,3,5-triazine of formula

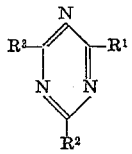

wherein $R^1$, $R^2$ and $R^3$ are the same as defined above with elemental fluorine at a temperature in the range from about −40° C. to about 100° C. in an amount and for a period of time at least sufficient for said fluorinated 1,3,5-triazine to form.

5. The process according to claim 4 wherein $n$ is 2 and the reaction is carried out at a temperature in the range from about −10° C. to about 10° C.

6. The process according to claim 4 wherein $n$ is 3 and the reaction is carried out at a temperature in the range from about 10° C. to about 100° C.

7. The process for preparing 2,3,4,5-tetrafluoro-2,4,6-trichloro-tetrahydro-1,3,5-triazine which comprises contacting 2,4,6-trichloro-1,3,5-triazine with elemental fluorine at a temperature in the range from about −10° C. to about 10° C. in an amount and for a period of time at least sufficient for said 2,3,4,5-tetrafluoro-trichloro-1,3,5-triazine to form.

8. The process for preparing 1,2,3,4,5,6-hexafluoro-2,4,6-tris(trifluoromethyl)-hexahydro-1,3,5-triazine comprises contacting 2,4,6-tris(trifluoromethyl)-1,3,5-triazine with elemental fluorine at a temperature in the range from about 40° C. to about 100° C. in an amount and for a period of time at least sufficient for said 1,2,3,4,5,6-hexafluoro-2,4,6-tris(trifluoromethyl)-hexahydro-1,3,5-triazine to form.

9. 1,2,3,4,5,6-hexafluoro-2,4,6-trifluorohexahydro-1,3,5-triazine.

10. 2,3,4,5-tetrafluoro-2,4,6-trichloro-tetrahydro-1,3,5-triazine.

References Cited in the file of this patent

UNITED STATES PATENTS 2,777,847     Grundmann et al.     Jan. 15, 1957

OTHER REFERENCES

Bigelow et al.: Jour. Amer. Chem. Soc., vol. 56, pages 2773–2774 (1934.)

Bigelow et al.: Ind. Eng. Chem., vol. 39, pages 360–364 (1947).

McBee et al.: Ind. Eng. Chem., vol. 39, pages 391–392 (1947).

Gilbert et al.: Jour. Amer. Chem. Soc., vol. 72, pages 2411–2417 (1950).

Chemical Abstracts, vol. 52, columns 19639 to 19640 (1958). Abstracts of Sato et al., Bull. Yamagata Univ. Engr., vol. 5, pp. 55–71 (1958).

Chemical Abstracts, vol. 52, subject index, p. 2729s (1958).